United States Patent
Dagani et al.

(10) Patent No.: US 12,112,420 B2
(45) Date of Patent: Oct. 8, 2024

(54) METHOD AND APPARATUS FOR IMPROVING THE IMAGE QUALITY OF VARIABLE RATE SHADING USING GRADIENTS

(71) Applicant: Samsung Electronics Co., Ltd., Suwon-si (KR)

(72) Inventors: Gabriel T. Dagani, Austin, TX (US); Raun Krisch, Dripping Springs, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 127 days.

(21) Appl. No.: 17/834,907

(22) Filed: Jun. 7, 2022

(65) Prior Publication Data
US 2023/0177762 A1    Jun. 8, 2023

Related U.S. Application Data

(60) Provisional application No. 63/287,057, filed on Dec. 7, 2021.

(51) Int. Cl.
*G06T 15/00* (2011.01)

(52) U.S. Cl.
CPC .................................. *G06T 15/005* (2013.01)

(58) Field of Classification Search
CPC ............................... G06T 15/005; G06T 15/00
USPC ......................................................... 345/506
See application file for complete search history.

(56) References Cited

U.S. PATENT DOCUMENTS

| | | | |
|---|---|---|---|
| 9,779,542 B2* | 10/2017 | Clarberg | G06T 15/80 |
| 10,192,280 B2 | 1/2019 | Saleh et al. | |
| 10,255,660 B2 | 4/2019 | Grahn et al. | |
| 10,650,566 B2 | 5/2020 | Nevraev et al. | |
| 11,120,620 B2* | 9/2021 | Strugar | G06T 3/4007 |
| 2008/0055338 A1 | 3/2008 | Wei et al. | |
| 2015/0009223 A1* | 1/2015 | Havlir | G06F 9/3867 345/522 |
| 2017/0091990 A1* | 3/2017 | Clarberg | G06T 15/80 |
| 2018/0233681 A1* | 8/2018 | Tang | H10K 71/00 |
| 2019/0035049 A1 | 1/2019 | Backer et al. | |
| 2021/0012563 A1* | 1/2021 | Strugar | G06T 15/005 |

* cited by examiner

*Primary Examiner* — Javid A Amini
(74) *Attorney, Agent, or Firm* — Renaissance IP Law Group LLP

(57) ABSTRACT

A system and a method are disclosed for post-processing variable pixel rate shader output using gradients in a graphics processing unit. A block of pixels is selected that corresponds to a predetermined kernel size for variable rate shading in a draw call of an application. A pixel shader run is instantiated to generate pixel shading values for at least two pixels located within the block of pixels. A gradient output is generated based on an interpolation of the pixel shading values for the at least two pixels over the block of pixels. The predetermined kernel size may include at least one of a 4×2 block of pixels, a 2×4 block of pixels, a 4×4 block of pixels, an 8×4 block of pixels, a 4×8 block of pixels, and an 8×8 block of pixels or larger. The at least two pixels may be corner pixels of the block of pixels.

20 Claims, 5 Drawing Sheets

METHOD AND APPARATUS FOR IMPROVING THE IMAGE QUALITY OF VARIABLE RATE SHADING USING GRADIENTS

CROSS-REFERENCE TO RELATED APPLICATIONS

This application claims the priority benefit under 35 U.S.C. § 119(e) of U.S. Provisional Application No. 63/287,057, filed on Dec. 7, 2021, the disclosure of which is incorporated herein by reference in its entirety.

TECHNICAL FIELD

The subject matter disclosed herein relates to generating images for display. More particularly, the subject matter disclosed here relates to a system and method that provides gradient post-processing functionality for variable rate shading.

BACKGROUND

With the advent of 4K and 8K digital screens, the amount of pixels generated for images on 4K and 8K digital screens has grown at a steep rate. Accordingly, Graphics Processing Units (GPUs) are increasingly unable to perform the processing to support new graphical/photorealistic rendering techniques while generating all of the pixels at 60-240 FPS. In order to compensate for this large amount of processing, shortcuts have been developed to reduce the workload for rendering engines while keeping the picture quality subjectively unaffected.

One shortcut technique is called Variable Rate Shading (VRS), which duplicates single pixels into 2×1, 1×2, 2×2, 2×4, 4×2, or 4×4 blocks of pixels (also referred to as VRS kernels). VRS may use either a framebuffer mask to indicate which pixels are duplicated into which block sizes, or may use a pixel rate calculation per material or per draw. VRS may be setup by an application when the feature is made available by a graphics driver. Application writers may choose how to use this feature based on a degree of savings versus a degradation of picture quality.

For larger VRS kernel settings (e.g. 4×4 pixel blocks or greater), the usability of traditional VRS in real situations may be reduced because the likelihood of a 4×4 pixel block (i.e., 16 samples) being all one color is relatively low.

SUMMARY

An example embodiment provides a method to post-process variable pixel rate output using gradients in a GPU in which the method may include: detecting, by the GPU, a block of pixels that corresponds to a predetermined kernel size for variable rate shading in a draw call of an application; instantiating, by the GPU, a pixel shader run to generate pixel shading values for at least two pixels located within the block of pixels; and generating, by the GPU, a gradient output for the block of pixels based, at least in part, on an interpolation of the pixel shading values for the at least two pixels over the block of pixels. In one embodiment, the predetermined kernel size may include at least one of a 4×2 block of pixels, a 2×4 block of pixels, a 4×4 block of pixels, an 8×4 block of pixels, a 4×8 block of pixels, an 8×8 block of pixels, and a 16×16 block of pixels. In another embodiment, generating the gradient output for the block of pixels may be further based, at least in part, on a gradient direction. In still another embodiment, the at least two pixels comprise corner pixels of the block of pixels. In yet another embodiment, generating the gradient output for the block of pixels may be further based, at least in part, on a gradient type that may include a linear gradient or an oriented gradient. In one embodiment, instantiating the pixel shader run to generate pixel shading values for the at least two pixels may include instantiating pixel shader runs for four pixels located within the block of pixels, and generating the gradient output for the block of pixels may be based, at least in part, on an interpolation of the pixel shading values for the four pixels over the block of pixels. In another embodiment, the pixel shading values may be based, at least in part, on a programmable shading output that may include at least one of linear shading, radial shading, and interpolation-based shading.

An example embodiment provides a method to post-process variable pixel rate output using gradients in a GPU in which the method may include: determining, by the GPU, that variable rate shading is enabled for a draw call of an application; determining, by the GPU, that gradient processing is enabled for variable rate shading; determining, by the GPU, a block of pixels that corresponds to a predetermined kernel size in the draw call; instantiating, by the GPU, a pixel shader run to generate pixel shading values for at least two pixels located within the block of pixels; and generating, by the GPU, a gradient output for the block of pixels based, at least in part, on an interpolation of the pixel shading values for the at least two pixels over the block of pixels. In one embodiment, the predetermined kernel size may include at least one of a 4×2 block of pixels, a 2×4 block of pixels, a 4×4 block of pixels, an 8×4 block of pixels, a 4×8 block of pixels, an 8×8 block of pixels, and a 16×16 block of pixels. In another embodiment, generating the gradient output for the block of pixels may be further based, at least in part, on a gradient direction. In another embodiment, the at least two pixels may include corner pixels of the block of pixels. In still another embodiment, generating the gradient output for the block of pixels may be further based, at least in part, on a gradient type that may include a linear gradient or an oriented gradient. In yet another embodiment, instantiating the pixel shader run to generate pixel shading values for the at least two pixels may include instantiating pixel shader runs for four pixels located within the block of pixels, and generating the gradient output for the block of pixels may be based, at least in part, on an interpolation of the pixel shading values for the four pixels over the block of pixels. In one embodiment, the pixel shading values may be based, at least in part, on programmable shading output that includes at least one of linear shading, radial shading and interpolation-based shading.

An example embodiment provides a GPU that may include a graphics pipeline and a controller. The graphics pipeline may be configured to increase a pixel rate of rendered content. The controller may be coupled to the graphics pipeline, and may be configured to: detect a block of pixels that corresponds to a predetermined kernel size for variable rate shading in a draw call of an application, instantiate a pixel shader run to generate pixel shading values for at least two pixels located within the block of pixels, and generate a gradient output for the block of pixels based, at least in part, on an interpolation of the pixel shading values for the at least two pixels over the block of pixels. In one embodiment, the predetermined kernel size may include at least one of a 4×2 block of pixels, a 2×4 block of pixels, a 4×4 block of pixels, an 8×4 block of pixels, a 4×8 block of pixels, and an 8×8 block of pixels. In another embodiment, the controller may be further configured to generate the gradient output for the block of pixels further based, at least in part, on a gradient direction. In still another embodiment, the at least two pixels may include corner pixels of the block of pixels. In yet another embodiment, the controller may be further configured to generate the gradient output for the block of pixels further based, at least in part, on a gradient type that may include a linear gradient or an oriented gradient. In one embodiment, the controller instantiates the pixel shader run to generate pixel shading values for the at least two pixels by instantiating pixel shader runs for four pixels located within the block of pixels, and the gradient output generated for the block of pixels may be based, at least in part, on an interpolation of the pixel shading values for the four pixels over the block of pixels.

BRIEF DESCRIPTION OF THE DRAWING

In the following section, the aspects of the subject matter disclosed herein will be described with reference to exemplary embodiments illustrated in the figure, in which.

DETAILED DESCRIPTION

Figure 1A:
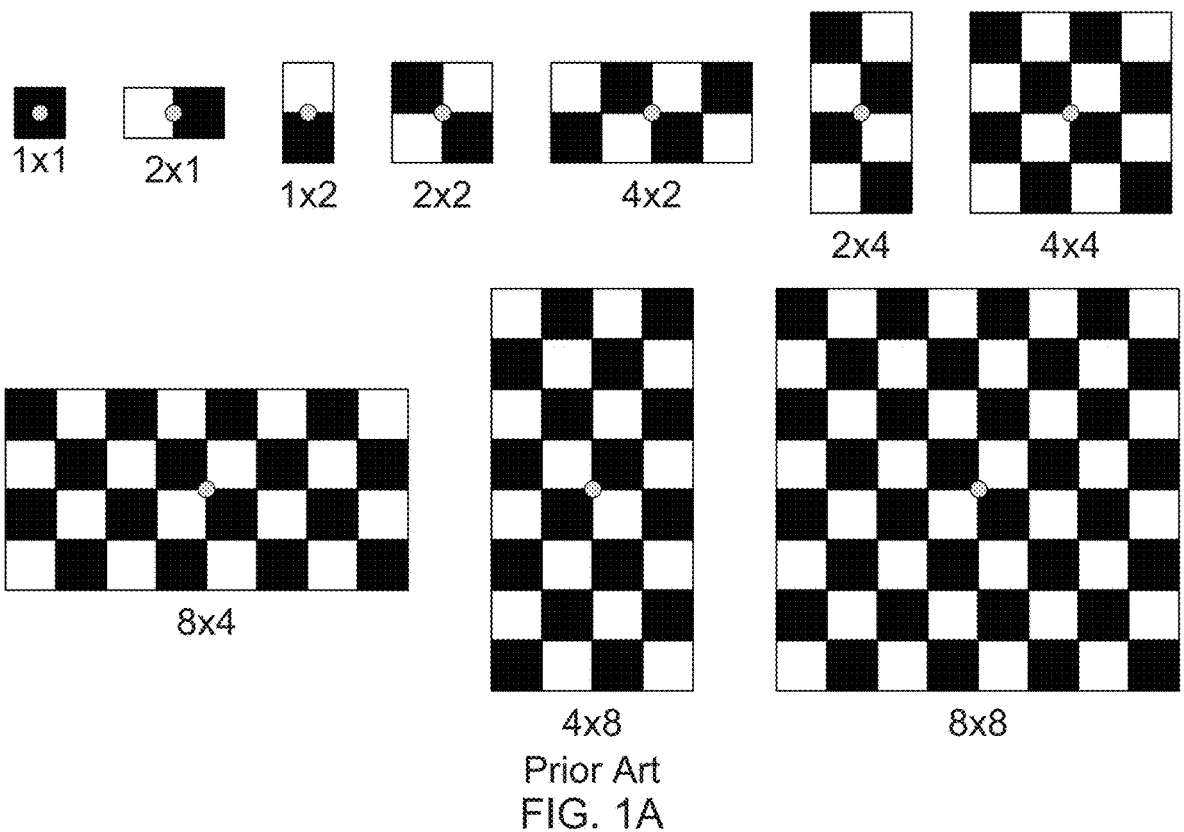
FIG. 1A depicts traditional pixel shader compute locations, indicated by dots at the center of a VRS kernel, for generating pixel shader values.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures, or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system-on-a-chip (SoC), an assembly, and so forth.

The subject matter disclosed herein improves the capability of VRS by including a color gradient post-processing technique for a VRS output. In one embodiment, the color gradient post-processing technique disclosed herein provides a gradient-blending operation over a square or rectangle VRS kernel that uses pixel shader computed values determined within the VRS kernel. The gradient-blending operation may be based on a programmable shading output, such as but not limited to, linear, radial, or another style of interpolation-based shading. Parameters used by the gradient-blending operation may include but are not limited to, one or more VRS kernel sizes, sample points, a gradient type, and/or gradient direction.

As used herein, the term VRS kernel may refer to a pixel shader footprint when the work of one pixel shader is duplicated to many pixels. In this regard, the term VRS kernel may also be considered to refer to a multi-pixel output fragment of a rendered frame.

For pixel block sizes (e.g., 4×2, 2×4, 4×8, 8×4 and 8×8) that are processed in a VRS-enabled pixel pipeline, additional pixel shaders may be run for two to four pixels located within a VRS kernel and used as inputs to the gradient function. That is, when the gradient post-processing technique disclosed herein is used, a gradient added to the VRS output may be based on one or more additional pixel shader computed values. Additionally, the gradient post-processing technique disclosed herein may also improve the usability of VRS kernel settings for pixel blocks greater than 4×4 pixels (e.g., 8×8 pixel blocks or of greater dimensions) by using four pixels within the VRS kernel that are processed and used as inputs to the gradient function. The gradient post-processing technique disclosed herein also provides a possibility that larger VRS kernel sizes are also possible with additional pixel shader computed values included as input.

The gradient post-processing technique disclosed herein provides an increased possibility that relatively larger VRS kernels may be used, and any additional pixel shader values that are computed may be considered to actually provide a computational savings in view of an improved image quality. For example, for the cost of four additional pixel shader computations, computations for 12 pixels (out of 16 for a 4×4 VRS kernel, 32 pixels (out of 36 for a 4×8 or an 8×4 VRS kernel) or 60 pixels (out of 64 for an 8×8 VRS kernel) are saved.

In one embodiment, the subject matter disclosed herein may be implemented as a mobile application processor (AP), but such an example implementation does not limit the possible implementations of the subject matter disclosed herein and example implementations may be any computer system that includes one or more CPUs, GPUs, NPUs (Neural Processor Units) and/or DPUs (Display Processor Units). In another embodiment, a VRS gradient as disclosed herein may be determined either in software using already-computed pixel shader values or by an application-specific integrated circuit (ASIC) post-process stage.

One example embodiment of the subject matter disclosed herein may be explicitly used by application developers in which parameters may be derived and passed into a graphics API or a new API graphics extension. In one embodiment, an alteration of an existing API graphics extension may be provided to enable the gradient post-processing technique disclosed herein. Alternatively, the subject matter disclosed herein may be implicitly derived and automated in a graphics driver using new GPU capabilities that are implemented either in software or hardware.

If, for example, an application developer explicitly uses the gradient post-processing technique disclosed herein, a parameter that may be passed into a graphics API may include one or more particular VRS kernel sizes, such as but not limited to, 2×2, 2×4, 4×2, 4×4, 4×8, 8×4 or 8×8 blocks of pixels. Alternatively or additionally, a range of kernel sizes may be passed into the graphics API. Another parameter that may be passed into the graphics API may include between two and four pixel locations within a VRS kernel that are to be used to perform pixel-shader calculations. Example locations may include, but are not limited to, top left and bottom right of a VRS kernel, center left and center right, top right and bottom left, top center and bottom center, and all four corners.

Figure 1B:
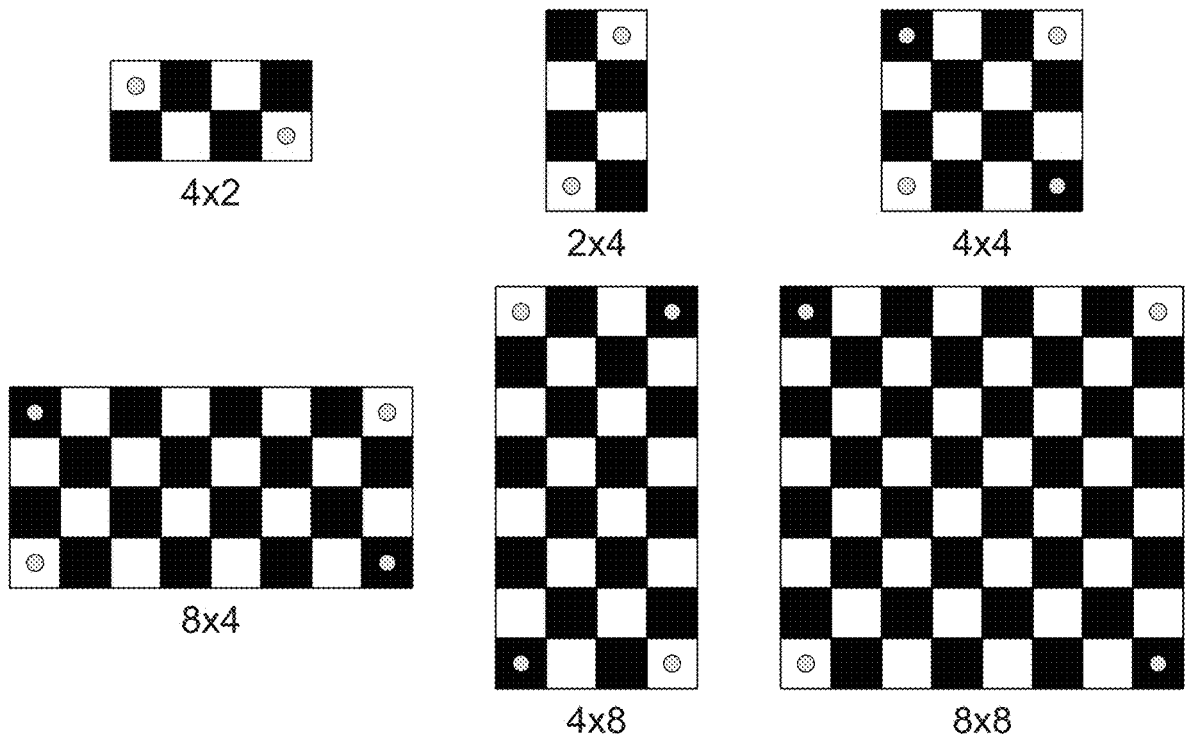
FIG. 1B depicts example kernel sizes and shapes that may be used for gradient VRS post-processing with additional pixel shader compute locations according to the subject matter disclosed herein.

FIG. 1A depicts traditional pixel shader compute locations, indicated by dots at the center of a VRS kernel, for generating pixel shader values. In the image, the pixel compute locations are indicated between 2 or 4 pixels, however, typically a single adjacent pixel is selected to represent the kernel based on convention (always bottom left) or other hardware implementation details. In contrast to FIG. 1A, FIG. 1B depicts example VRS kernel sizes and shapes that may be used for gradient post-processing according to the subject matter disclosed herein. The checkerboard-type pattern depicted in the figures of VRS kernels is intended to delineate pixels within a VRS kernel. In FIG. 1B, example pixel shader compute locations within the example VRS kernels are indicted by dots within example pixel locations. Other pixel locations within a VRS kernel may be used for pixel shader compute locations.

Other parameters that may be passed into a graphics API may include an implied gradient direction and a gradient type, such as a linear gradient or an oriented gradient. A linear gradient parameter provides an interpolation between pixel shader values (e.g., corners), and an oriented gradient parameter provides two color interpolation with a non-90 degree angle value (e.g. top/bottom/left/right directed gradient).

Figure 2:
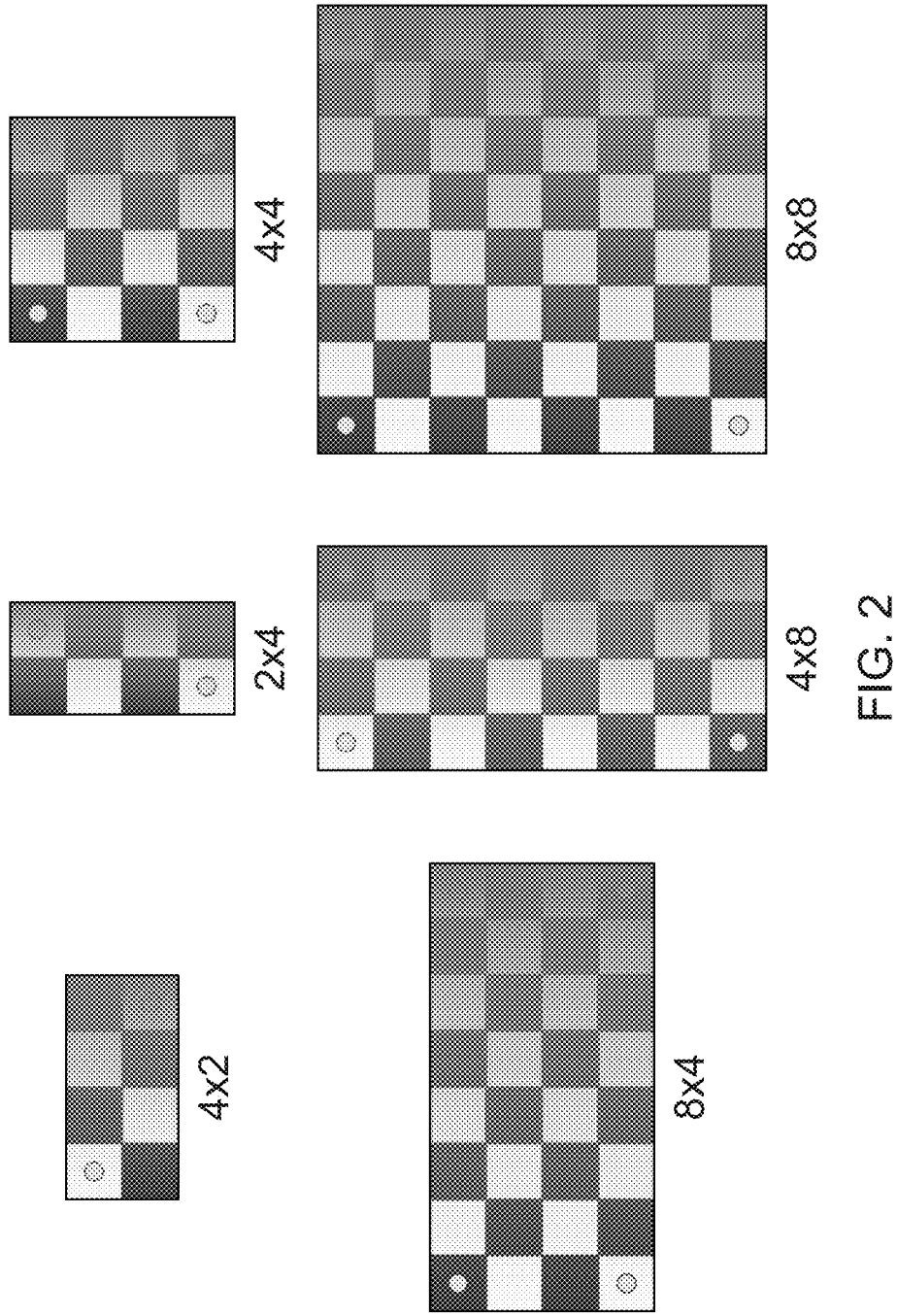
FIG. 2 depicts example VRS kernels in which pixel shader compute locations (indicated by dots) are shown with gradient emulations according to the subject matter disclosed herein.

A graphics driver may be configured to implicitly use the gradient post-processing technique disclosed herein for 2×4 and 4×2 kernels, in which case two pixel shader values may be determined (calculated) for gradient pixels that are located at, for example, predetermined corner locations with an inferred oriented gradient that may be based on neighboring pixels. Other pixel locations may be used. For 4×4 kernels and larger kernels, a graphics driver may implicitly use the gradient post-processing disclosed herein by determining two to four pixel shader values either by using gradient pixels that are located at predetermined corner locations, or by an explicit location indication provided by an application developer or by a user selection. That is, a graphics driver may be configured to include one or more variable parameter inputs that allow an application developer and/or a user to select kernel sizes and/or gradient-pixel locations. FIG. 2 depicts example VRS kernels in which pixel shader compute locations (indicated by dots) are shown with gradient emulations according to the subject matter disclosed herein.

Figure 3:
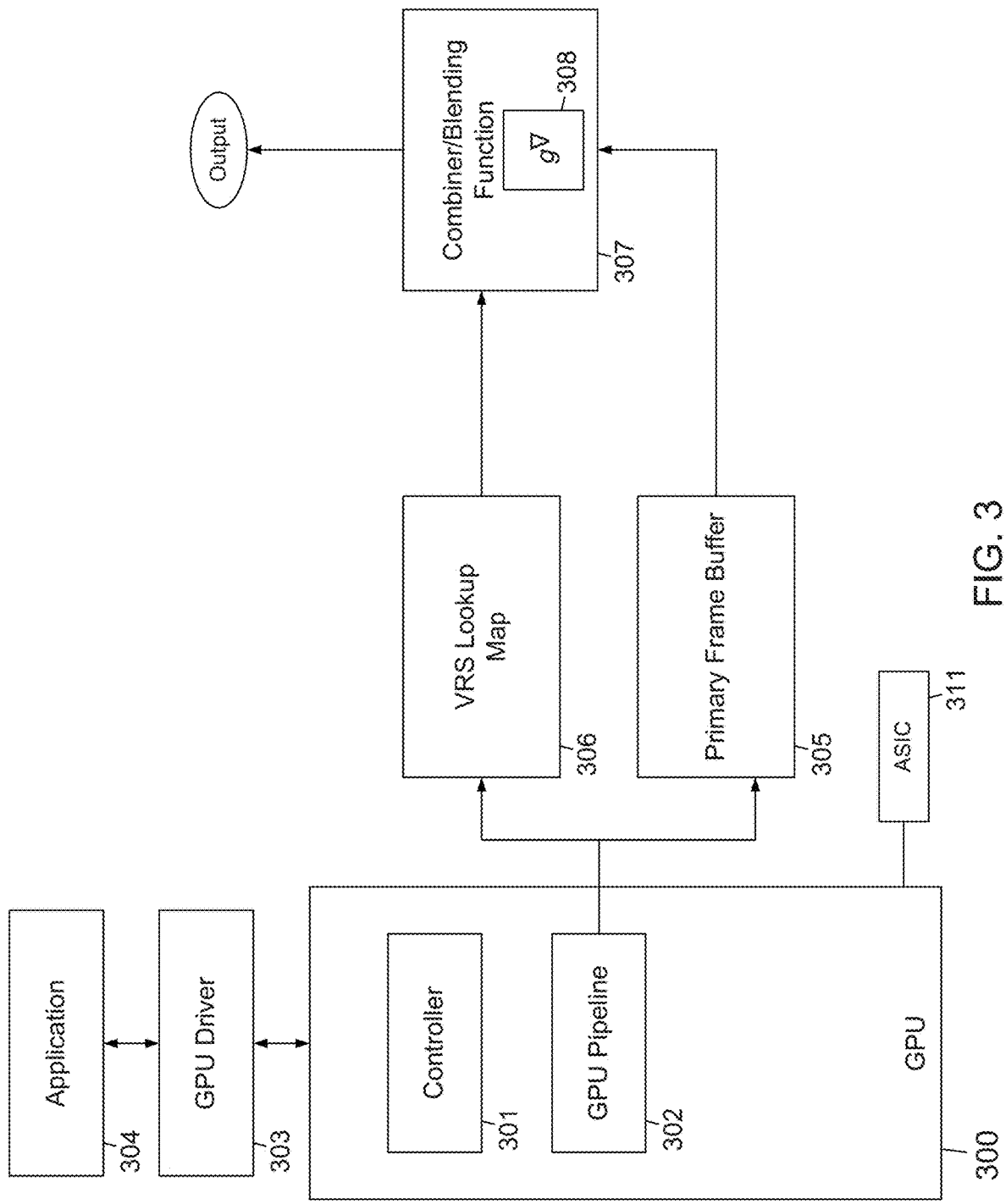
FIG. 3 is a functional block diagram of an example embodiment of a GPU that includes a capability for gradient post-processing according to the subject matter disclosed herein.

FIG. 3 is a functional block diagram of an example embodiment of a GPU 300 that includes a capability for gradient post-processing according to the subject matter disclosed herein. The GPU 300 may include a controller 301 and a graphics pipeline 302. The controller 301 may interface with and may be responsive to a GPU driver 303. An application/game 304 may interface with the GPU driver 303 for rendering on a display (not shown) that is coupled to the GPU. The graphics pipeline 302 may include functionality for detecting a block of pixels having one or more particular VRS kernel sizes to provide gradient post-processing as described herein. The graphics pipeline 302 may include, but is not limited to, one or more vertex shaders, hull shaders, geometry shaders, perspective transformers and/or pixel shaders, one or more clipping and culling stages, one or more rasterization stages, and one or more depth testing stages, all of which are not specifically shown as a pipeline configuration may be specific to a GPU embodiment.

The graphics pipeline 302 may also include a primary frame buffer 305 for non-VRS rendering and a secondary buffer (or VRS lookup map) 306 for one or more locations in a frame being currently rendered that have been determined (or detected) to correspond to one or more blocks of pixels having a particular VRS kernel size. The contents of the primary frame buffer 305 and the VRS lookup map 306 may be combined in a combiner/blending buffer 307 for output to a display (not shown). The combiner/blending buffer includes a gradient post-processing function 308. The combiner/blending buffer 307 does more than merely adding, or blending, the contents of the buffers 305 and 306 as two layers. The gradient post-processing uses a percentage of transparency parameter that is determined as part of the gradient post-processing to provide an additive blend based on the gradient.

Additionally or alternatively, an Application Specific Integrated Circuit (ASIC) 311 may be coupled to the GPU 300 to perform and/or assist in identifying blocks of pixels having one or more predetermined VRS kernel sizes.

The various components and functional capabilities of the GPU 300 may be provided by one or more modules. Some embodiments of the GPU 300 may be implemented on a mobile application processor, but it should be understood that implementation is not so limited and may be implemented in other contexts, such as, a computer system that may make use of a subset of a central processing unit (CPU), GPU, NPU, and/or a DPU. Further, some embodiments may use a GPU 300 with a NN model to combine, or blend, an output of the application having VSR functionality. The gradient post-processing functionality of the GPU 300 may include an on/off feature that may be selectable by a user and/or an OEM as to whether and/or when the VRS feature should be activated or not activated. The level of VRS may also be selectable to provide a desired level of image quality.

Figure 4:
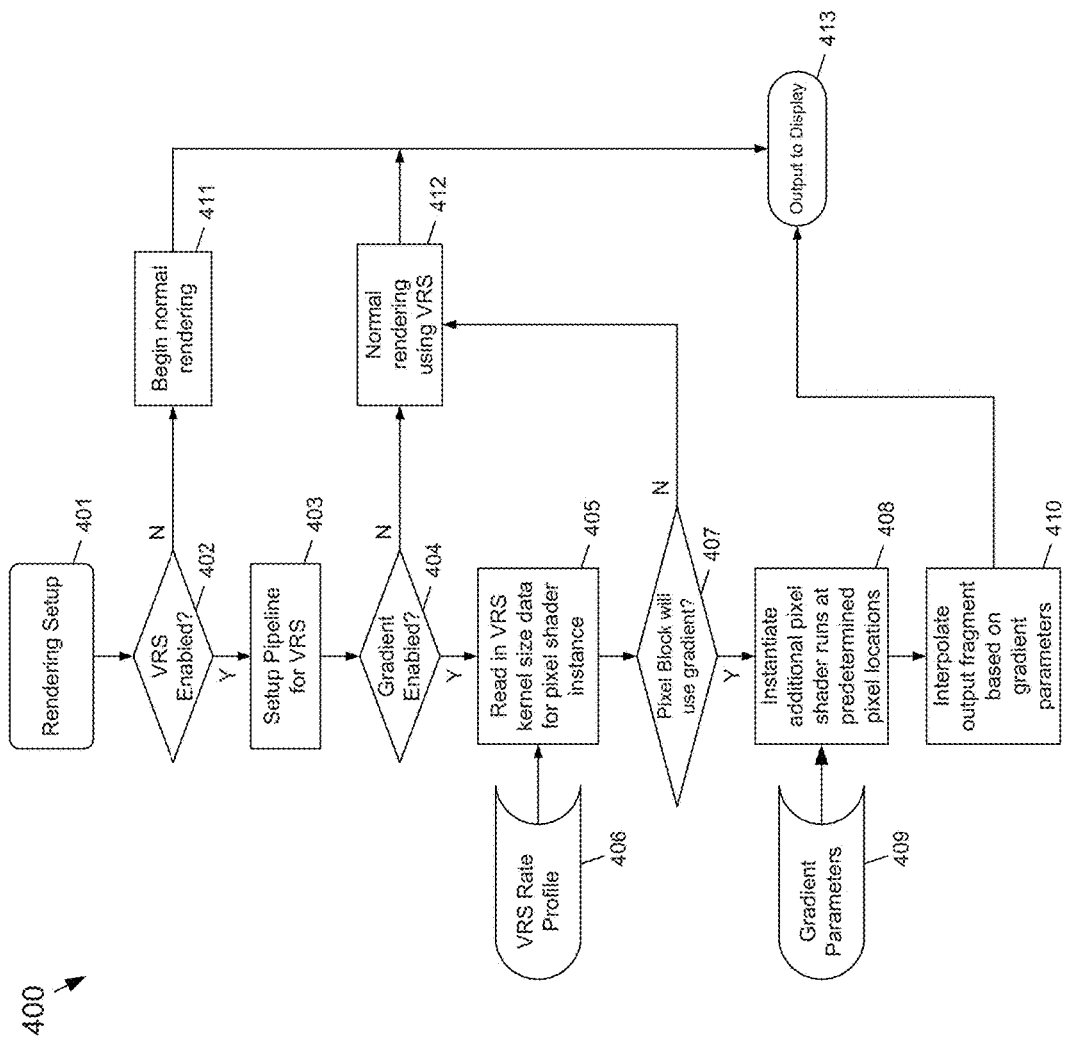
FIG. 4 is a flowchart of an example embodiment of a method for explicit use of gradient post-processing VRS according to the subject matter disclosed herein.

FIG. 4 is a flowchart of an example embodiment of a method 400 for explicit use of gradient post-processing VRS according to the subject matter disclosed herein. Implicit functionality of the gradient post-processing disclosed herein would follow a similar flow. At 401, a rendering setup is configured by, for example, an application developer. The rendering setup configures a GPU, such as the example GPU depicted in FIG. 3. At 402, the GPU determines whether VRS has been enabled by the rendering setup. If so, flow continues to 403 where the GPU pipeline is setup for VRS processing. At 404, the GPU determines whether gradient post-processing has been enabled. If so, flow continues to 405 where one or more VRS kernel sizes, pixel sample locations, and gradient based information may be obtained from a VRS rate profile 406.

At 407, the GPU determines whether a block of pixels is going to have a gradient based on kernel size heuristics retrieved from the VRS rate profile 406. If so, flow continues to 408 where the GPU instantiates additional pixel shader runs at predetermined pixel shader compute locations using gradient parameters 409. At 410, the gradient post-processing of the GPU interpolates an output fragment (a VRS kernel) based on the gradient parameters. Flow continues to 413 where the rendered output is sent to a display.

If, at 402, the GPU determines that VRS has not been enabled, flow continues to 411 where normal rendering (i.e., non-VRS) takes place. Flow then continues to 413 where the rendered output is sent to the display.

If, at 404, the GPU determines that gradient post-processing has not been enabled, flow continues to 412 where normal rendering using VRS takes place. Flow then continues to 413 where the rendered output is sent to the display.

If, at 407, the GPU determines that no blocks of pixels have a size that is equal to the one or more VRS kernel sizes obtained from the VRS rate profile 406, flow continues to 412 where normal rendering using VRS takes place. Flow then continues to 413 where the rendered output is sent to the display.

Additional embodiments may use hardware to implement part of or the entire process for gradient VRS disclosed herein based on heuristics of regular VRS, and/or additional parameters to refine gradient type (based on neighboring kernels or temporal and local kernels). Alternatively, software may be used to implement part of or the entire process for gradient VRS disclosed herein.

Figure 5:
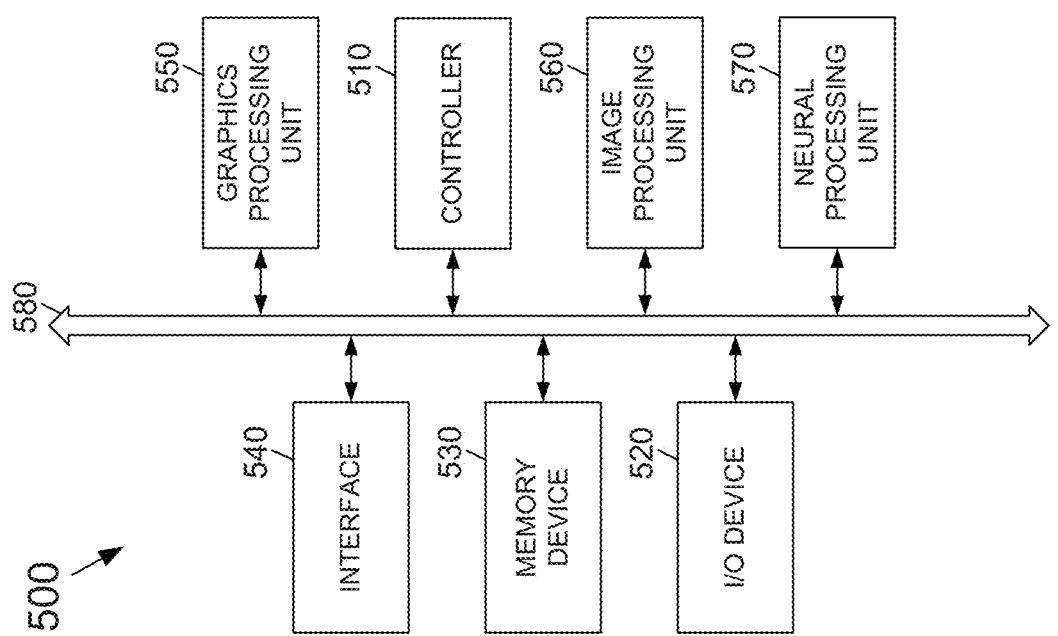
FIG. 5 depicts an electronic device that in one embodiment may include a GPU that provides gradient post-processing according to the subject matter disclosed herein.

FIG. 5 depicts an electronic device 500 that in one embodiment may include a GPU that provides gradient post-processing according to the subject matter disclosed herein. Electronic device 500 and the various system components of electronic device 500 may be formed from one or more modules. The electronic device 500 may include a controller (or CPU) 510, an input/output device 520 such as, but not limited to, a keypad, a keyboard, a display, a touch-screen display, a 2D image sensor, a 3D image sensor, a memory 530, an interface 540, a GPU 550, an imaging-processing unit 560, a neural processing unit 570, a TOF processing unit 580 that are coupled to each other through a bus 590. In one embodiment, the GPU 550 includes functionality that provides gradient post-processing as disclosed herein. The controller 510 may include, for example, at least one microprocessor, at least one digital signal processor, at least one microcontroller, or the like. The memory 530 may be configured to store a command code to be used by the controller 510 and/or to store a user data.

The interface 540 may be configured to include a wireless interface that is configured to transmit data to or receive data from, for example, a wireless communication network using a RF signal. The wireless interface 540 may include, for example, an antenna. The electronic system 500 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method to post-process variable pixel rate output using gradients in a Graphics Processing Unit (GPU), the method comprising:
   detecting, by the GPU, a block of pixels that corresponds to a predetermined kernel size for variable rate shading in a draw call of an application;
   instantiating, by the GPU, a pixel shader run to generate pixel shading values for at least two pixels located within the block of pixels; and
   generating, by the GPU, a gradient output for the block of pixels based, at least in part, on an interpolation of the pixel shading values for the at least two pixels over the block of pixels, wherein the predetermined kernel size and a location of the two pixels located within the block of pixels are based on a variable rate shading rate profile.

2. The method of claim 1, wherein the predetermined kernel size comprises at least one of a 4×2 block of pixels, a 2×4 block of pixels, a 4×4 block of pixels, an 8×4 block of pixels, a 4×8 block of pixels, an 8×8 block of pixels, and a 16×16 block of pixels.

3. The method of claim 1, wherein generating the gradient output for the block of pixels is further based, at least in part, on a gradient direction.

4. The method of claim 1, wherein the at least two pixels comprise corner pixels of the block of pixels.

5. The method of claim 1, wherein generating the gradient output for the block of pixels is further based, at least in part, on a gradient type that comprises a linear gradient or an oriented gradient.

6. The method of claim 1, wherein instantiating the pixel shader run to generate pixel shading values for the at least two pixels comprises instantiating pixel shader runs for four pixels located within the block of pixels, and
wherein generating the gradient output for the block of pixels is based, at least in part, on an interpolation of the pixel shading values for the four pixels over the block of pixels.

7. The method of claim 1, wherein the pixel shading values are based, at least in part, on a programmable shading output comprising at least one of linear shading, radial shading, and interpolation-based shading.

8. A method to post-process variable pixel rate output using gradients in a Graphics Processing Unit (GPU), the method comprising:
determining, by the GPU, that variable rate shading is enabled for a draw call of an application;
determining, by the GPU, that gradient processing is enabled for variable rate shading;
determining, by the GPU, a block of pixels that corresponds to a predetermined kernel size in the draw call;
instantiating, by the GPU, a pixel shader run to generate pixel shading values for at least two pixels located within the block of pixels; and
generating, by the GPU, a gradient output for the block of pixels based, at least in part, on an interpolation of the pixel shading values for the at least two pixels over the block of pixels, wherein the predetermined kernel size and a location of the two pixels located within the block of pixels are based on a variable rate shading rate profile.

9. The method of claim 8, wherein the predetermined kernel size comprises at least one of a 4×2 block of pixels, a 2×4 block of pixels, a 4×4 block of pixels, an 8×4 block of pixels, a 4×8 block of pixels, an 8×8 block of pixels, and a 16×16 block of pixels.

10. The method of claim 8, wherein generating the gradient output for the block of pixels is further based, at least in part, on a gradient direction.

11. The method of claim 8, wherein the at least two pixels comprise corner pixels of the block of pixels.

12. The method of claim 8, wherein generating the gradient output for the block of pixels is further based, at least in part, on a gradient type that comprises a linear gradient or an oriented gradient.

13. The method of claim 8, wherein instantiating the pixel shader run to generate pixel shading values for the at least two pixels comprises instantiating pixel shader runs for four pixels located within the block of pixels, and
wherein generating the gradient output for the block of pixels is based, at least in part, on an interpolation of the pixel shading values for the four pixels over the block of pixels.

14. The method of claim 8, wherein the pixel shading values are based, at least in part, on programmable shading output comprising at least one of linear shading, radial shading and interpolation-based shading.

15. A graphics processing unit (GPU), comprising:
a graphics pipeline configured to increase a pixel rate of rendered content; and
a controller coupled to the graphics pipeline, the controller being configured to:
detect a block of pixels that corresponds to a predetermined kernel size for variable rate shading in a draw call of an application,
instantiate a pixel shader run to generate pixel shading values for at least two pixels located within the block of pixels, and
generate a gradient output for the block of pixels based, at least in part, on an interpolation of the pixel shading values for the at least two pixels over the block of pixels, wherein the predetermined kernel size and a location of the two pixels located within the block of pixels are based on a variable rate shading rate profile.

16. The GPU of claim 15, wherein the predetermined kernel size comprises at least one of a 4×2 block of pixels, a 2×4 block of pixels, a 4×4 block of pixels, an 8×4 block of pixels, a 4×8 block of pixels, and an 8×8 block of pixels.

17. The GPU of claim 15, wherein the controller is further configured to generate the gradient output for the block of pixels further based, at least in part, on a gradient direction.

18. The GPU of claim 15, wherein the at least two pixels comprise corner pixels of the block of pixels.

19. The GPU of claim 15, wherein the controller is further configured to generate the gradient output for the block of pixels further based, at least in part, on a gradient type that comprises a linear gradient or an oriented gradient.

20. The GPU of claim 15, wherein the controller instantiates the pixel shader run to generate pixel shading values for the at least two pixels by instantiating pixel shader runs for four pixels located within the block of pixels, and
wherein the gradient output generated for the block of pixels is based, at least in part, on an interpolation of the pixel shading values for the four pixels over the block of pixels.

* * * * *